July 27, 1937.　　　　E. R. HERSHEY　　　　2,088,519
BRICK GRAB
Filed Nov. 18, 1936　　　　3 Sheets-Sheet 1

Inventor
E. R. Hershey
By Mason Fenwick & Lawrence
Attorneys

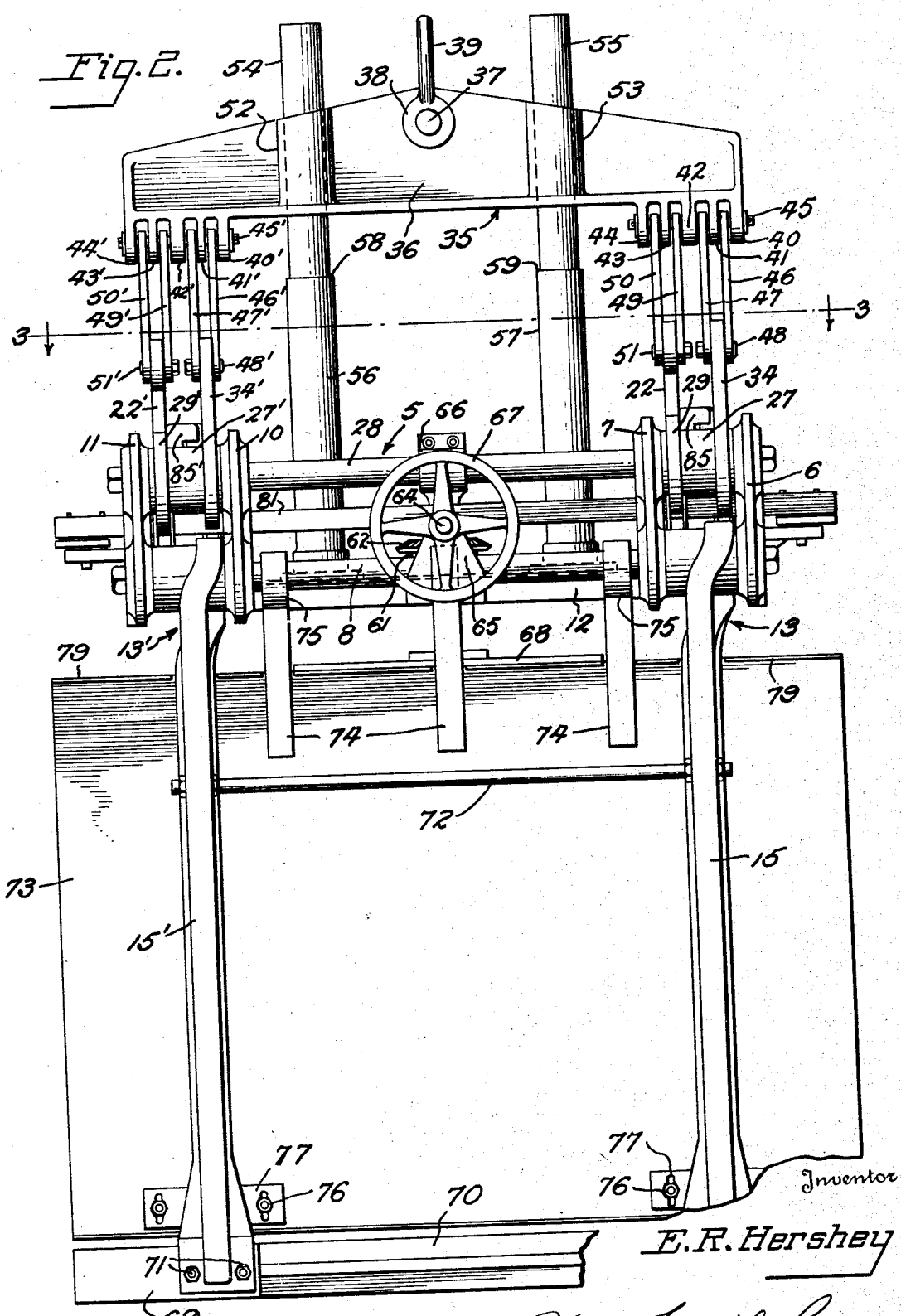

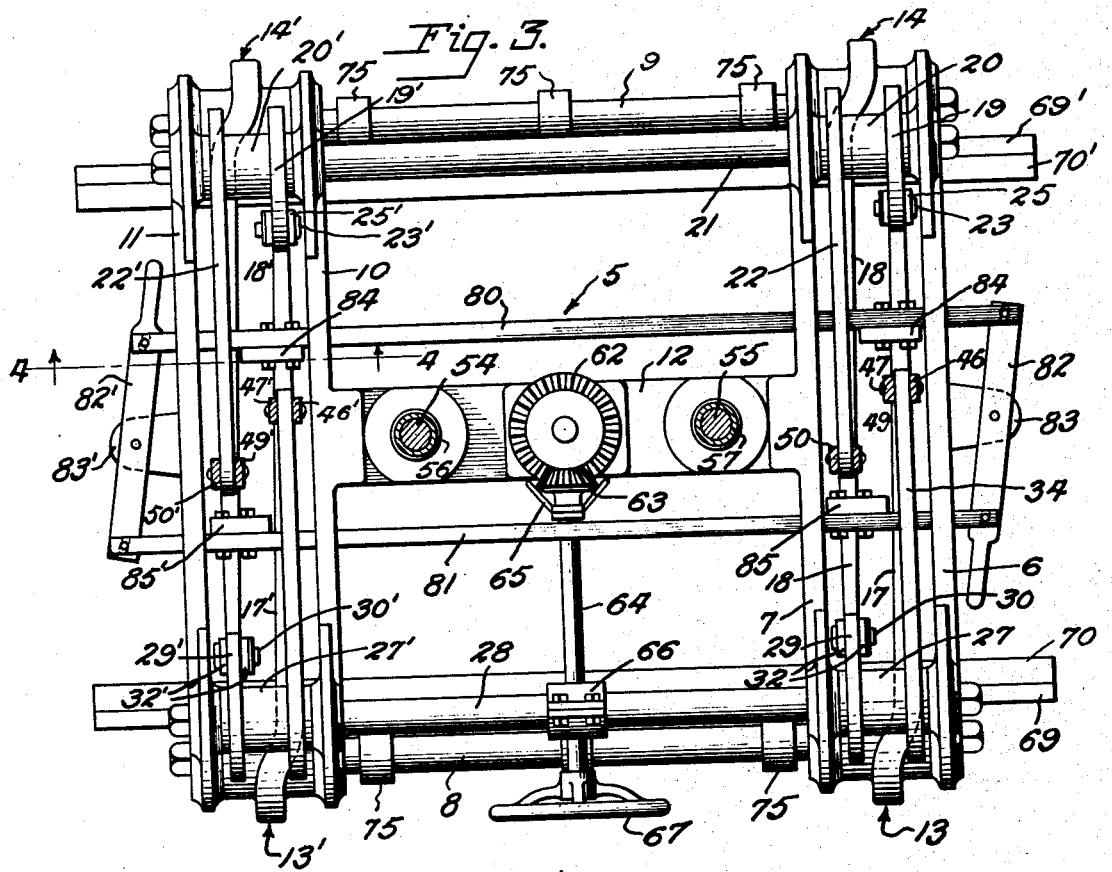
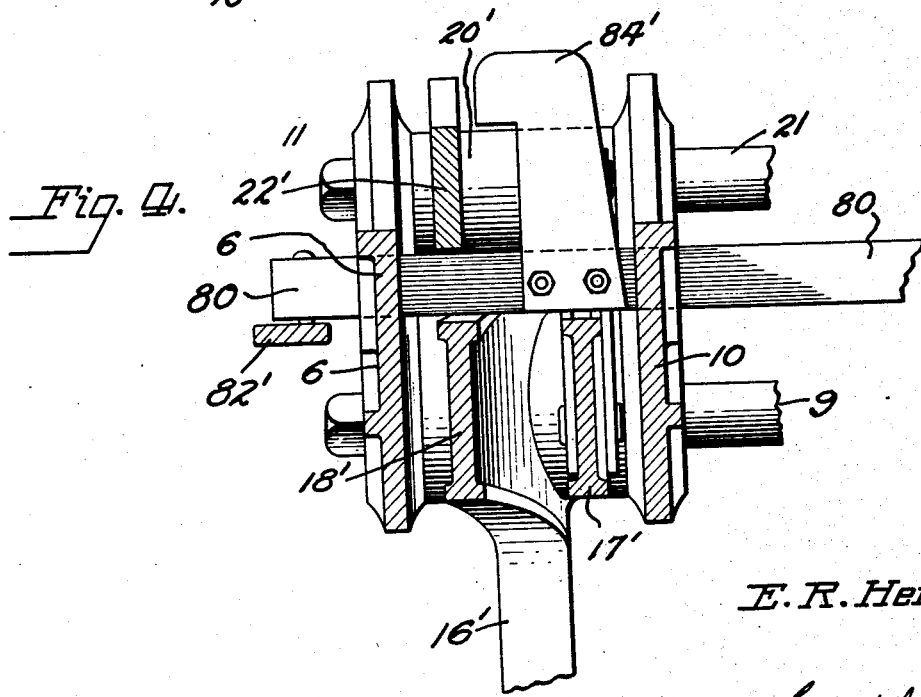

Patented July 27, 1937

2,088,519

UNITED STATES PATENT OFFICE 2,088,519

BRICK GRAB

Elwood R. Hershey, Akron, Pa., assignor to Lancaster Iron Works, Lancaster, Pa., a corporation of Pennsylvania Application November 18, 1936, Serial No. 111,532

10 Claims. (Cl. 294—63)

The invention forming the subject matter of this application is a brick lifter or "grab" of the type designed to handle large unit stacks of brick and similar objects, to lift and transport these stacks as units from one location to another.

The main object of the invention is to provide a brick lifter of this character which is of light weight and of great strength in comparison to its weight, and which can be cheaply manufactured and sold.

Other objects of the invention will become apparent as the detailed description thereof proceeds.

In the drawings:

Figure 2 is a side elevation of the device shown in Figure 1;

Figure 3 is a horizontal section taken on the line 3—3 of Figures 1 and 2; and

Figure 4 is a vertical transverse section to an enlarged scale, taken on the line 4—4 of Figure 3.

Figure 1:
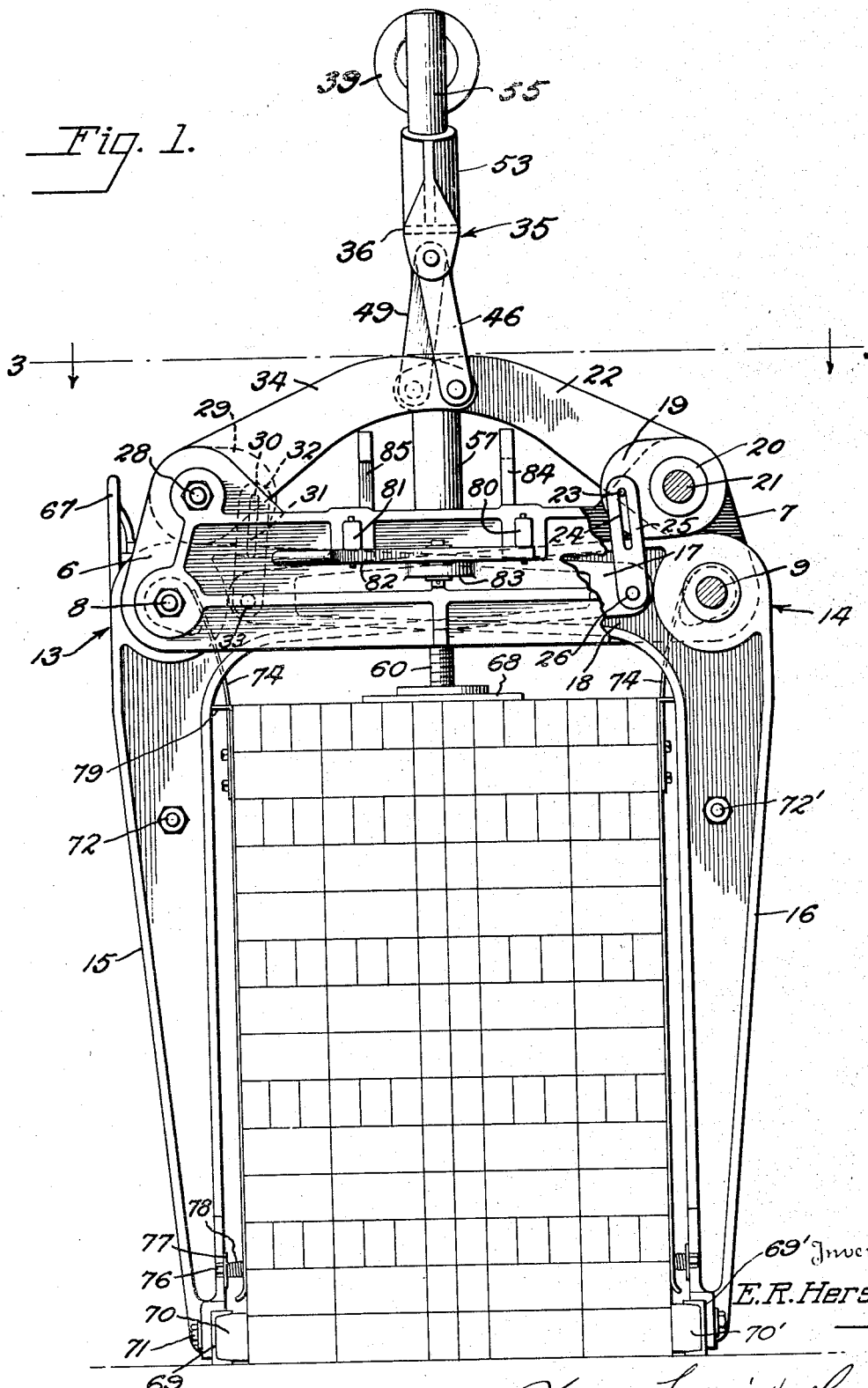
Figure 1 is an end elevation of a preferred form of the invention, parts being broken away and others shown in section to illustrate details of construction.

The brick lifter shown in the drawings, comprises a substantially rectangular frame designated generally by the reference numeral 5. This frame comprises a pair of side plates 6 and 7 secured at their opposite ends by transverse pivot rods 8 and 9 to another pair of side plates 10 and 11 similar in every respect to the plates 6 and 7. Centrally between the pivot rods 8 and 9, the inner plates 7 and 10 are suitably secured to each other by a transverse plate 12 which may be cast integral with the plates 7 and 10.

As shown in Figures 2 and 3, the side plates 6 and 7 are spaced apart on the pivot rods 8 and 9, to receive between them the bell crank levers designated generally by the reference numerals 13 and 14. These bell crank levers 13 and 14 are pivoted at their elbows to the pivot rods 8 and 9 of the framework where they extend between the plates 6 and 7. The downwardly extending arms 15 and 16 of these bell crank levers constitute gripping arms or jaws of the same length, and are each shaped at their lower ends to receive one end of grip bars to be described later.

The other arms 17 and 18 of the respective bell crank levers 13 and 14 extend across the framework between the plates 6 and 7; and as shown in Figure 3 are laterally offset with respect to each other, in order to provide for compactness in the structure. Directly above the free end of the arm 17, a lever 19 projects radially from a sleeve 20 which is mounted to rotate on a rod 21 which extends through apertures suitably formed in the plates 6 and 7. The rod 21 is parallel to the pivot rod 9; and the sleeve 20 is parallel to the pivot rod 9; and the sleeve 20 has formed integral therewith a lifting lever 22, extending substantially half way across the frame 5.

The lever 19 is provided near its free end with a pivot pin 23, which extends slidably and pivotally through slots 24 formed in each of a pair of links 25, the lower ends of which are pivoted by means of the pins 26 to the free end of the bell crank lever arm 17.

A sleeve 27 similar to the sleeve 20, is mounted to rotate on a pivot rod 28 which extends through apertures suitably formed in the plates 6 and 7. The sleeve 27 has cast integral therewith, or otherwise suitably secured thereto, a lever 29 provided at its outer end with a pivot pin 30 which extends pivotally and slidably through slots 31 formed in a pair of links 32, pivotally connected at their lower ends by a pin 33 to the free end of the lever arm 18 of the bell crank lever 14. The rod 28 is parallel to the pivot rod 8, and the sleeve 27 has formed integral therewith a lifting lever 34 which extends substantially half way across the frame 5. In order to swing the gripping arms 15 and 16 of the lifter toward and from each other about their pivots 8 and 9, there is provided a lifting head designated generally by the reference numeral 35. This lifting head comprises a casting 36 provided at its center with a pivot pin 37 adapted to receive the bifurcated end 38 of an eye 39 intended to receive a hook from a hoist or traveling crane (not shown). One end of the lifting head 35 is shaped to form a series of downwardly projecting lugs 40, 41, 42, 43, and 44 spaced apart to form pivot brackets apertured to receive a pivot pin 45. In the recesses formed between the lugs 40, 41, and 42, the upper ends of a pair of links 46 and 47 are pivoted to swing about the pin 45. The lower ends of the links 46 and 47 are pivoted to the free end of the lifting arm 34 by means of the pivot pin 48. In the recesses formed by the lugs 42, 43, and 44, the upper end of a pair of links 49 and 50 are pivoted to the pin 45; and the lower ends of the links 49 and 50 are pivoted to the free end of the lifting lever 22 by means of the pivot pin 51.

It will be evident, particularly from Figure 1 of the drawings, that when the lifting head is drawn upwardly, the lifting levers 22 and 34 will rotate about their pivot rods 21 and 28 to cause the levers 19 and 29, through the links 25 and 32 and arms 17 and 18, to swing the gripping arms 15 and 16 inwardly toward each other.

The lifting mechanism on the other side of the frame 5 mounted between the plates 10 and 11 is identical structurally with that mounted between the plates 2 and 3. The elements of this mechanism between plates 10 and 11 are not described in detail, but are identified with the same reference numerals primed as are applied to the corresponding elements supported between plates 6 and 7.

The head 36 is provided with bosses 52 and 53 equidistantly spaced from the pivot 37. These bosses are bored to receive slidably the reduced ends 54 and 55 of guide rods 56 and 57 which are fixed at their lower ends to the transverse plate 12 of the frame 5. The shoulders 58 and 59 on these guide rods constitute stops to limit the downward movement of the head 36 relative to the frame 5.

To prevent buckling of the pile of bricks during the lifting operation, a screwthreaded rod 60 is keyed to slide non-rotatably through a suitable aperture in the transverse plate 12. The rod 60 meshes with a nut 61 which is provided with a flange cut to form a bevel gear 62 meshing with a bevel gear 63 secured to the end of a shaft 64. The shaft 64 is journaled at its inner end in a bracket 65 suitably secured to the plate 12; and at its outer end is journaled in a bearing bracket 66 clamped to the pivot rod 28. A hand wheel 67 secured to the outer end of shaft 64 facilitates rotation of said shaft. The lower end of the rod 60 has secured thereto a flat plate 68 adapted to contact, over a comparatively large area, with the top of a stack of bricks to be lifted; not only to prevent buckling of the stack during the lifting thereof, but also to serve as a depth gage by means of which the lower ends of the gripping arms may be adjusted in accordance with the height of the pile of bricks to be lifted.

The gripping arms 13 and 13', as shown in Figures 1 and 3, are recessed at their lower ends to receive the channel iron 69 which is suitably secured by welding, or otherwise, to the said lower ends. This channel iron forms a seat for a yielding brick grip 70, which is preferably formed as a bar of rubber having its face corrugated or grooved to provide a non-slip gripping surface. This bar 70 may be secured to the channel iron by any suitable means such as the bolts 71. The channel iron 70 serves as a brace for the lower ends of the arms 13 and 13'; and a rod 72 serves to brace the upper ends of said arms.

An apron 73, extending across the arms 13 and 13', has secured to its upper end a number of strong leaf springs 74 fixed to sleeves 75 pivoted on the rod 8. The leaf springs are bent so as to throw the center of gravity of the apron below the axis of the rod 8. This arrangement causes the lower end of the apron 73 to follow the lower ends of the arms 13 and 13' as they separate when the lifter is lowered over a pile of bricks.

The lower end of the apron 73 terminates above the grip bar 70, and is provided with bolts 76 which pass freely through apertures formed in plates 77 suitably secured to the arms 13 and 13'. Compression springs 78 surround the bolts 76 and are interposed between the apron 73 and the plates 77 to permit yielding contact between the lower end of the apron and the pile of bricks. The apron is bent at its upper end to form a stiffening flange 79; and is suspended, as a whole, from the pivot rod 8 by the springs 74.

This brick lifter is provided with means, operable from either side of the lifter, for locking the gripping arms in spread apart position during the lowering of the lifter over a stack of bricks, or during the raising of the lifter from a deposited stack. This locking mechanism comprises a pair of rods 80 and 81 mounted to slide through apertures formed in the plates 6, 7, 10 and 11. These rods parallel to each other and to plate 12, are of equal lengths and are spaced equidistantly from opposite sides of plate 12.

The opposite ends of the rods 80 and 81 are pivoted to handle members 82 and 82', which are pivoted at their centers to the brackets 83 and 83' projecting laterally outward from the plates 6 and 11, respectively.

The rod 80 has secured thereto a pair of latches 84 and 84' adapted to be moved to the left as shown in Figures 3 and 4 to lock the lifting levers 22 and 22' in lowered position. Similarly, the rod 81 has secured thereto the pair of latches 85 and 85' to lock the lifting levers 22 and 22' in lowered position. It will be obvious from inspection of Figure 3 that the rods 80 and 81 always slide in opposite directions when either of the handle members 82 or 82' is rotated about its pivot connection on the brackets 83 or 83'.

The invention may be embodied in other specific forms without departing from the spirit or essential characteristics of the invention, and the present embodiment is therefore to be considered in all respects as illustrative and not restrictive, the scope of the invention being indicated by the appended claims rather than the foregoing description, and all changes which come within the meaning and range of equivalency of the claims are therefore intended to be embraced therein.

What I claim is:

1. A brick grab including a frame, grip jaws pivoted to said frame, means on said frame to swing the free ends of the jaws toward and from each other, a pair of rods slidable across said frame, means pivoted to said frame, and pivotally connected to one end of each of said rods for causing the rods to slide in opposite directions, and means on said rods operable to lock the first named means in position to hold said jaws with their free ends at a predetermined distance from each other.

2. A brick grab including a frame, grip jaws pivoted to said frame, means on said frame to swing the free ends of the jaws toward and from each other, a pair of rods mounted to slide parallel to each other on said frame, a lever pivoted to one end of each of said rods and fulcrumed to said frame, and means on said rod operable by the sliding movement thereof to lock the first named means in position to hold said jaws with their free ends at a predetermined distance from each other.

3. A brick grab including a frame, grip jaws pivoted to the frame, lever mechanisms on opposite ends of the frame to swing the free ends of the jaws toward and from each other, a pair of rods mounted to slide parallel to each other on said frame and across said mechanisms, a lever pivoted to said frame and to one end of each of said rods to reciprocate the same in opposite directions, and means on the rods for simultaneously locking said mechanisms in position to hold said jaws with their free ends at a predetermined distance from each other.

4. A brick grab including a frame, grip jaws pivoted to the frame, means on said frame to swing the free ends of the jaws toward and from each other, leaf springs pivoted to said frame, plates secured at one end to the ends of said springs and depending therefrom to extend across the inner faces of said grip jaws.

5. A brick grab including a frame, grip jaws pivoted to the frame, means on said frame to swing the free ends of the jaws toward and from each other, leaf springs pivoted to said frame, plates secured at one end to the ends of said springs and depending therefrom to extend across the inner faces of said grip jaws, and yielding means connecting the lower ends of said plates to the lower ends of said jaws.

6. A brick grab including a frame, bell crank levers pivotally connected to opposite ends of said frame, plates pivoted to the opposite ends of said frame and depending therefrom along the inner faces of the depending arms of said bell crank levers, other levers pivoted to the frame above the bell crank levers, links pivoted to the free ends of the horizontal arms of said bell crank levers and slidably and pivotally connected to the free ends of said other levers, and means on the frame for locking the bell crank levers in spread apart position.

7. A brick grab including a frame, bell crank levers pivoted at their elbows to opposite ends of said frames, plates extending across the inner faces of the depending arms of said levers, leaf springs pivotally connected at one end of each to said frame, and fixed at the other end of each to the upper ends of said plates, and yielding means connecting the lower ends of said plates to the lower ends of said bell crank levers.

8. A brick grab including a frame, gripping jaws pivoted to said frame, means connected to said jaws to swing the free ends thereof toward and from each other, a supporting plate adjustably connected to the center of said frame to move in a direction substantially perpendicular thereto, means for adjusting said supporting plate, plates extending across the inside faces of said jaws, yielding means for pivotally connecting said plates to opposite ends of said frame, and yielding means connecting the lower ends of said plates to the lower ends of said jaws.

9. A brick grab including a frame, grip jaws pivoted to opposite ends of said frame, means on said frame to swing the free ends of the jaws toward and from each other and including levers pivoted to said opposite ends, rods slidable parallel to each other on said frame, latches secured to said rods and adapted to engage said levers to lock the same in position to hold said jaws with their free ends at a predetermined distance from each other, and means pivoted to said frame and rods for sliding said rods and their latches into locking engagement with said levers.

10. A brick grab including a frame, grip jaws pivoted to opposite ends of said frame, means on said frame to swing the free ends of the jaws toward and from each other and including levers pivoted to said opposite ends, rods slidable parallel to each other on said frame, latches secured to said rods and adapted to engage said levers to lock the same in position to hold said jaws with their free ends at a predetermined distance from each other, and means pivoted to said frame and rods on opposite ends of said frame for sliding said rods and their latches in opposite directions into locking engagement with said levers.

ELWOOD R. HERSHEY.